(12) United States Patent
Vinogradov et al.

(10) Patent No.: US 7,325,739 B2
(45) Date of Patent: Feb. 5, 2008

(54) ELECTRO-OPTICAL SCANNER HAVING EXIT WINDOW WITH LIGHT COLLECTING OPTICS

(75) Inventors: Igor R. Vinogradov, Bay Shore, NY (US); Tsi David Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 349 days.

(21) Appl. No.: 11/139,965

(22) Filed: May 27, 2005

(65) Prior Publication Data

US 2006/0266838 A1   Nov. 30, 2006

(51) Int. Cl.
*G02B 26/00* (2006.01)
(52) U.S. Cl. ............ 235/462.35; 235/454; 235/462.43; 359/362; 359/363; 359/364
(58) Field of Classification Search ........... 235/462.45, 235/462.22, 462.32, 462.23, 462.35, 462.43, 235/454; 359/362–364
See application file for complete search history.

(56) References Cited

U.S. PATENT DOCUMENTS 4,760,248 A * 7/1988 Swartz et al. .......... 235/462.21
5,187,353 A * 2/1993 Metlitsky et al. ...... 235/462.35

* cited by examiner

*Primary Examiner*—Michael G. Lee
*Assistant Examiner*—Pedro A Rojas
(74) *Attorney, Agent, or Firm*—Tarolli, Sundheim, Covell & Tummino LLP

(57) ABSTRACT

A portable electro-optical scanner for reading a target bar code having a plurality of bar code elements. The portable scanner includes: a housing supporting a scanning module and an optic system. The scanning module electro-optically scans the target bar code with a scanning beam and collects reflected light returning from the bar code. The scanning module includes a beam source emitting a scanning beam, beam directing apparatus causing the scanning beam to be repetitively scanned along a scanning plane intersecting the target bar code and photodetector circuitry receiving light from the target bar code. The optic system includes an exit window, a light collection lens and a reflective surface. The scanning beam passes through the exit window upon exiting the housing. The light collection lens receives reflected light from the target bar code and directing the reflected light toward a focal point. The focal point lying on the scanning plane of the scanning beam. The reflective surface is disposed between the light collection lens and the focal point to redirect the reflected light passing through the light collection lens toward the photodetector circuitry.

23 Claims, 2 Drawing Sheets

ELECTRO-OPTICAL SCANNER HAVING EXIT WINDOW WITH LIGHT COLLECTING OPTICS

FIELD OF THE INVENTION

The present invention relates to an electro-optical scanner for reading bar codes and, more particularly, to a non retro-reflective scanner including an exit window having a light collecting system incorporating a total internal reflection surface.

BACKGROUND OF THE INVENTION

Electro-optical scanners are widely used for reading bar codes, including one dimensional and two dimensional bar codes. A scanner typically includes a scanning module which: generates a scanning beam; repetitively directs and scans the beam across a target object, such as a bar code; receives reflected light from the target object; and digitizes and decodes the reflected light to decode the information encoded in the bar code. The scanning module is supported in a housing of the hand held portable scanner which also supports a power supply and other electronics of the scanner.

The scanning module scanning beam (typically a laser beam emitted by a laser diode) is directed at an oscillating scanning mirror. The oscillating scanning mirror, in turn, directs the beam outwardly through an exit window of the scanner. The exit window of the scanner functions to protect the internal components of the scanner supported within the scanner housing from the outside environment. The oscillation of the oscillating reflector causes the scanning beam to oscillate across a target object such as a bar code to be read. Essentially, the beam generates a beam spot that repetitively moves across or scans the bar code.

The light-colored or space elements of the bar code reflect the laser beam illumination and the dark or black bar elements of the bar code absorb the laser beam. Reflected light from the target bar code is received by a reflective surface such as a collection mirror and/or a lens and directed toward photodetector circuitry, such as a photodiode. The pattern of reflected light, as received by the photodiode of the scanning module, is a representation of the pattern of the bar code. That is, a sequence of time when the photodiode is receiving reflected light represents the laser beam spot moving across a space of the bar code, while a sequence of time when the photodiode is not receiving reflected light represents the laser moving across a dark bar. Since the scanning speed or velocity of the reciprocating movement of the laser is known, the elapsed time of the photodiode receiving reflected light can be converted into a width of a bar code element corresponding to a space, while the elapsed time of the photodiode not receiving reflected light can be converted into a width of a bar code element corresponding to a bar.

The photodiode is part of photodetector circuitry which converts the reflected light into an analog signal. The scanning module includes an A/D converter or digitizer to digitize the analog signal generated by the photodiode. The digitizer outputs a digital bar code pattern (DPB) signal representative of the bar code pattern. A decoder of the scanning module inputs the DPB signal and decodes the bar code. The decoded bar code typically includes payload information about the product that the bar code is affixed to. Upon successful decoding of the scanned bar code, the scanner may provide an audio and/or visual signal to an operator of the scanner to indicate a successful read and decode of the bar code. The scanner typically includes a display to display payload information to the operator and a memory to store information decoded from the bar code.

One type of electro-optical scanner, referred to as a retro-reflective scanner, employs retro-reflective light collection. In a retro-reflective scanner, the scanning module includes a mirror that both: 1) directs the scanning beam toward the target bar code or another mirror; and 2) receives reflected light from target bar code and directs it toward the photosensor circuitry. Another type of electro-optical scanner is referred to as a non retro-reflective scanner. In such a non retro-reflective scanner, the mirror that receives the reflected illumination and directs it toward the photodetector circuitry is physically separate from the mirror that directs the laser beam toward the target bar code.

A prior art portable electro-optical non retro-reflective scanner is shown at 200 in FIG. 1. The scanner 200 includes a housing 212 supporting a scanning module 220 which includes a laser diode light assembly 230 for emitting a scanning beam. The scanning beam (labeled SB1) is directed to a mirror 250 which repetitively oscillates about a vertical axis Y-Y through a scanning angle β. The redirected scanning beam (labeled SB2) exits the housing 212 through an exit window 218. Because of the oscillation of the mirror 250, the scanning beam SB2 is repetitively scanned in a horizontal direction forming a linear scan line SL.

Since the beam line SB2 is being scanned horizontally, the beam forms a horizontal scan line SL (FIG. 1) which extends across the bar code 100. Thus, a pie shaped scanning plane SP is formed emanating from the oscillating mirror 250. To scan and read a target bar code 100, the scan line SL is positioned to intersect the target bar code as shown in FIG. 1. Illumination or light from the scan line SL reflected from the target bar code 100 (labeled RSB in FIG. 1) passes through a light collection lens 260 and is focused on photodetector circuitry 240.

In non retro-reflective scanners, the light collection lens 260 (or system of lens) is typically employed to collect light reflected from the target bar code 100 and focus the reflected light rays RSB on the photodetector circuitry 240. As can be seen in FIG. 1, the light collection lens 260 is spaced from the scanning beam SB2, that is, the scanning beam SB2 does not pass through the light collection lens. One problem with the collection lens 260 of a non retro-reflective scanner stems from parallax effect. Because the collection lens 260 is spaced from the beam line SB2, an optical axis of the lens does not lie on the same axis as the scanning beam SB2 and, therefore, there is a parallax effect. An optical axis of a lens is defined as the straight line which passes through the center of curvature of the lens surface. A central ray though the scan plane SP is defined as the scanning beam line axis A-A.

For example, as is shown in FIG. 1, if the light collection lens 260 is disposed vertically above the scanning beam line axis A-A, because of the parallax effect, the light collection lens must be provided with an additional field of view (labeled FOV in FIG. 1) in a direction orthogonal to the beam axis A-A (that is, in the vertical direction) to be able to "see," that is, receive and focus reflected light from the scan line SL as it traverses or intersects the bar code 100. This is because the scan line SL intersects the bar code 100 at a vertical level that is below the level of the lens 260. Thus, the light collection lens 260 must look downwardly to "see" reflected light from the scan line SL impinging upon the target bar code 100. Stated another way, the light collection lens 260 must have a vertical field of view to "see" reflected light from the scan SL when scanning bar codes which are close in proximity to a forward nose N of the scanner and bar codes which are more distant. Unfortunately, an unfortunate result of increasing the vertical field of vision of the light collection lens 260 more ambient light (that is, light not reflected from the scan line SL) is focused on the photodetector circuitry decreasing the signal-to-noise ratio and generally making it more difficult to successfully decode the target bar code 100.

What is desired is a light collection lens system that would substantially eliminate the parallax effect in non retro-reflective scanners. What is also needed is a light collection lens system that would eliminate or reduce the need for additional FOV in a direction orthogonal to the scanning beam axis. What is also needed is a light collection lens system that reduces the amount of ambient light focused on the photodetector circuitry.

SUMMARY OF THE INVENTION

The present invention is directed to a portable electro-optical scanner for reading a target bar code having a plurality of bar code elements. The portable scanner includes a housing supporting a scanning module for electro-optically reading the target bar code by the bar code with a scanning beam and collecting reflected light returning from the bar code, the scanning beam and the reflected light passing through an optic system supported by the housing. The scanning module includes a beam source, beam directing apparatus and photodetector circuitry. The beam source emits a scanning beam which is repetitively scanned across the target bar code by beam directing apparatus. Repetitive scanning of the scanning beam defines a pie-shaped scanning plane originating from the beam directing apparatus.

The optics system includes an integral exit window, light collection lens and a reflective surface. The scanning beam exits the housing through the exit window and reflected light from the target bar code is received by the light collection lens. The light collection lens is configured to direct the reflected light to a focal point which is located in the scanning plane of the scanning beam. Stated another way, the optical axis of the light collection optics coincides with the scanning plane. The reflective surface is disposed between the collection lens and the collection lens focal point to direct the reflected light focused by the collection lens toward the photodetector circuitry.

Having the focal point of the light collection lens lie in the plane of the scanning beam substantially eliminates the parallax effect. Thus, the light collection lens does not require an additional field of view in a direction orthogonal to the scanning beam axis. Moreover, since the light collection lens does not require an additional field of view in a direction orthogonal to the scanning beam axis, the amount of ambient light impinging on the photodetector circuitry is reduced, thereby improving the signal to noise ratio and the quality of the signal output by the photodetector circuitry.

In one aspect, the present invention features a portable electro-optical scanner for reading a target bar code having a plurality of bar code elements. The portable scanner includes:

a) a housing supporting a scanning module and an optic system;

b) the scanning module electro-optically reading the target bar code with a scanning beam and collecting reflected light returning from the bar code, the scanning module including a beam source emitting a scanning beam, beam directing apparatus causing the scanning beam to be repetitively scanned along a scanning plane across the target bar code and photodetector circuitry receiving light from the target bar code; and c) the optic system including:

1) an exit window through which the scanning beam passes upon exiting the housing;

2) a light collection lens receiving reflected light from the target bar code and directing the reflected light toward a focal point located on the scanning plane of the scanning beam, and 3) a reflective surface disposed between the light collection lens and the collection lens focal point to redirect the reflected light passing through the light collection lens toward the photodetector circuitry.

These and other objects, advantages, and features of the exemplary embodiment of the invention are described in detail in conjunction with the accompanying drawings.

DETAILED DESCRIPTION

Figure 1:
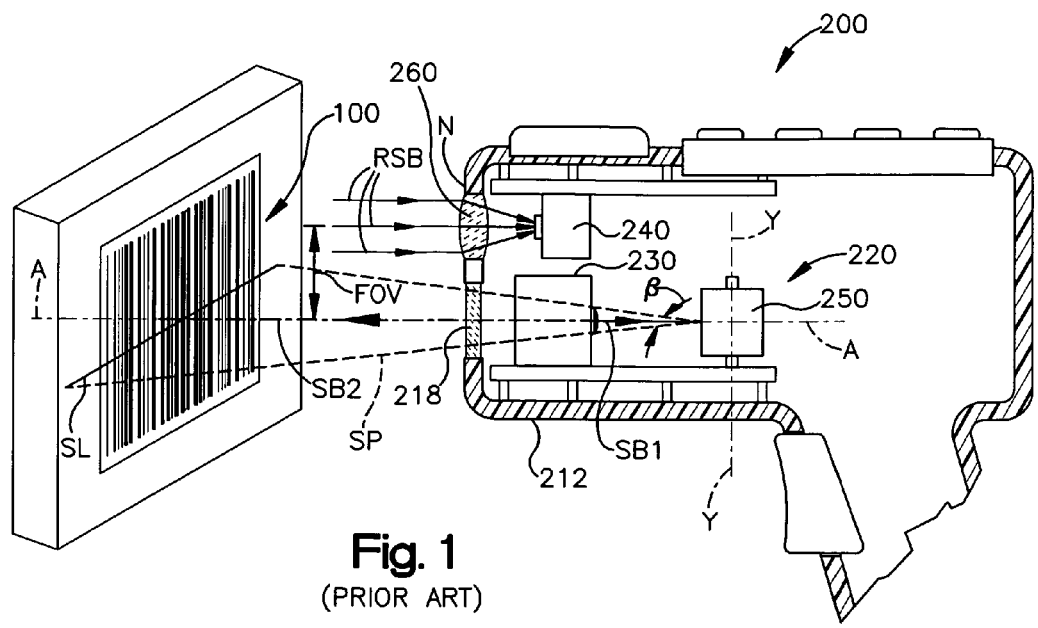
FIG. 1 is schematic view, partly in section and partly in front elevation, of a prior art electro-optical non retro-reflective scanner.
Figure 2:
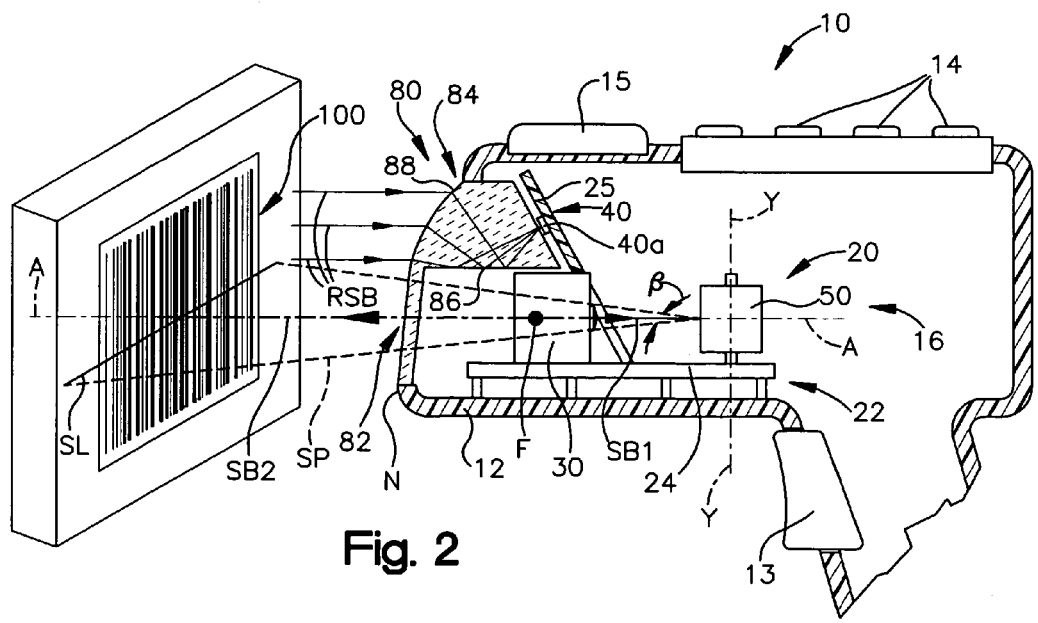
FIG. 2 is a schematic view, partly in section and partly in front elevation, of a portion of an electro-optical non retro-reflective scanner including an exit window of the present invention having an integral light collection system.

A portable electro-optical scanner of the present invention is shown schematically at 10 in FIG. 2. The scanner 10 may be used to scan and decode bar codes, such as, 1D and 2D bar codes and postal codes. As used herein, the term "bar code" is intended to be broadly construed to cover not only bar code symbol patterns comprised of alternating bars and spaces, but also other graphic patterns, such as dot or matrix array patterns and, more generally, indicia having portions of different light reflectivity or surface characteristics that result in contrasting detected signal characteristics that can be used for encoding information and can be scanned and decoded with the scanner 10. FIGS. 1 and 2 depict a target 1D bar code 100 affixed to a product 102.

In one preferred embodiment of the present invention, the scanner 10 is a hand held, portable bar code reader. The scanner 10 is supported in a housing 12 that can be carried and used by a user walking or riding through a store, warehouse or plant for reading bar codes for stocking and inventory control purposes.

However, it should be recognized that scanner 10 of the present invention may be embodied in a stationary scanner. It is the intent of the present invention to encompass all such scanners.

The scanner 10 includes an actuation trigger 13, a set of user input keys 14 and a visual display 15 for displaying decoded and/or other information. A speaker (not shown) providing an audio output to a user of the scanner 10 upon successful scanning and decoding of the target bar code 100 may also be provided. Also provided are data communications ports (not shown) and/or an rf transceiver (not shown) for uploading and downloading information to a remote computer system. The actuation trigger 13, input keys 14, display 15 and other input/output components are coupled to the circuitry 16 supported in the housing 12.

The scanner circuitry 16, which operates under the control of one or more microprocessors, includes a non retro-reflective scanning module 20. The scanning module 20 is supported by a housing 22 which includes a printed circuit board base 24 and an angled extending circuit board 25 which extends upwardly at an angle from the base 24. The scanning module 20 includes a laser diode assembly 30 for producing a scanning beam SB1, photodetector circuitry 40 including a photodiode 40a for receiving light reflected from the target bar code 100 and converting the light to an analog signal representative of the pattern of dark bars and light spaces of the bar code 100. The analog signal output by the photodetector circuitry 40 is digitized and decoded by an A/D converter and decoding circuitry, which are part of the scanner circuitry 16.

The scanning module 20 also includes a mirror 50 which is oscillated by a drive mechanism about an axis Y-Y (FIG. 2) through an arc or scanning rotation angle β. The mirror 50 intersects the scanning beam line SB1 generated by the laser diode assembly 30.

The laser diode assembly 30 and mirror 50 are affixed to the printed circuit board 24. The diode assembly 30 includes a laser diode and focusing optics which generate a scanning beam SB1 that is directed at the beam reflecting mirror 50, the beam line SB1 is reflected, redirected and scanned in a horizontal direction by the oscillating mirror 50. The redirected beam line SB2 exits and intersects the target bar code 100. Since the beam line SB2 is being scanned horizontally, the beam forms a horizontal scan line SL (FIG. 2) which extends across the bar code 100. Thus, as is shown schematically in dashed line in FIG. 2, a pie shaped scanning plane SP is formed emanating from the oscillating mirror 50. A central ray of the scanning plane SP defines a scanning beam line axis labeled as A-A in FIG. 2. Light from the scan line SL reflects off of the target bar code 100 and is received by the photodiode 40a of the photodetector circuitry 40 and decoded by decoding circuitry.

Optic Assembly 80

The scanner 10 utilizes a novel optic assembly or system 80 that includes an integral exit window 82 and a light collection lens 84. A lower planar surface of the light collection lens 84 includes a light reflective surface 86. Advantageously, the exit window 82 and light collection lens 84 may be molded out of plastic into a single, integrated optical element. The optical element 80 may be fabricated of acrylic, polycarbonate, or ZEONEX® polymer resin made by Zeon Chemicals L.P., Louisville, Ky. 40211. Other moldable plastics may be used, as would be recognized by one of skill in the art. Alternately, the exit window 82 and light collection lens may be separate components. It is the intent of the present invention to cover both such embodiments.

The scanning beam SB2 exits the housing through the exit window 82. The exit window 82 may be flat with respect to the scanning beam line axis A-A. Alternately, as shown in FIG. 2, the exit window 82 may be slightly canted or angled upwardly with respect to the scanning beam line axis A-A to minimize internal light scattering from the laser diode 30. The exit window is a flat optic piece with an optic power of zero. However, if it is desired for beam shaping purposes, the exit window 82 may be configured to have a non-zero optic power in either the horizontal direction (that is, the direction along the scan line SL) or the vertical direction (orthogonal to the scan line SL).

Reflected light from the target bar code 100 is shown as a set of parallel rays RSB in FIG. 2. At typical scanning distances (the distance from the nose N of the scanner 10 to the bar code 100), the reflected light rays RSB may be assumed to be parallel. The light collection lens 84 is configured such the reflected light rays RSB are directed to a focal point F along an optical axis of the lens 84 that intersects the scanning beam axis A-A. Stated another way, a convex surface 88 of the lens 84 converges/collects the reflected light rays RSB at the focal point F which lies on the scanning plane SP. When the focal point F is said to lie on the scanning plane SP what is meant is that the focal point of the lens 84 is located on or very near the scanning plane SP such that the parallax effect is minimized or substantially reduced.

Unfortunately, the photodiode 40a physically cannot be located at the focal point F because the laser diode assembly 30 is physically located at or near F. Therefore, the light reflective surface 86 is disposed between the collection lens 84 and the focal point F of the lens. Reflected light rays that are incident on the surface 86 at shallow angles, that is, angles that are greater than the critical angle ($\theta_C$) when measured with respect to a normal to the surface 86, then total internal reflection (TIR) of those reflected light rays occurs (rather than refraction) and the reflected light rays are directed by the reflected surface 86 toward the photodiode 40a located on the PC board 25.

The critical angle ($\theta_C$) is defined as:

$$\theta_C = \sin^{-1}(n2/n1)$$

where, $\theta_C$ is the angle from a line normal to the boundary of the first and second media and n1 and n2 are the indices of refraction of the first and second media, respectively. For n2<n1, a ray incident at an angle greater than $\theta_C$ will undergo total internal reflection (TIR). Here, at the boundary, that is, at the reflective surface 86, n1 is the index of refraction of the lens 84, while n2 is the index of refraction of air. Just by way of example, assume that the index of refraction of the lens 84 is n1=1.5 and the index of refraction of air is n2=1.0, then $$\theta_C = \sin^{-1}(n2/n1)$$

$$\theta_C = \sin^{-1}(1.0/1.5)$$

$$\theta_C = \sin^{-1}(0.667)$$

$$\theta_C = \sin^{-1}(0.667)$$

$$\theta_C = 41.8°$$

Since the critical angle $\theta_C$ (about 42°) is measured with respect to a line normal to the boundary, that is, normal to the reflective surface 86, any ray of reflected light that is incident on the surface at an angle greater than 42° from the normal will have TIR of the ray. Stated another way, any reflected light ray that is incident on the surface 86 at an angle shallower than 48° measured from a horizontal axis coincident with the reflective surface 86 will have TIR. For example, in FIG. 3, the reflected light ray RSB2 has the critical angle $\theta_C$ drawn in dashed line from the normal line N. Since the ray RSB2 has an angle of incidence greater than critical angle when measured from the normal line N, there is TIR of the ray RSB2.

Additionally, the light reflective surface 86 may be coated with a highly light reflective coating such as silver to reflect those reflected light rays that are incident on the surface 86 at angles greater than the critical angle. However, it should be recognized that by proper choice of the configuration of the light collection lens 84 TIR at the reflective surface 86 may be achieved without the necessity of coating, that is, if all rays are incident on the surface 86 at an angle greater than the critical angle.

Figure 3:
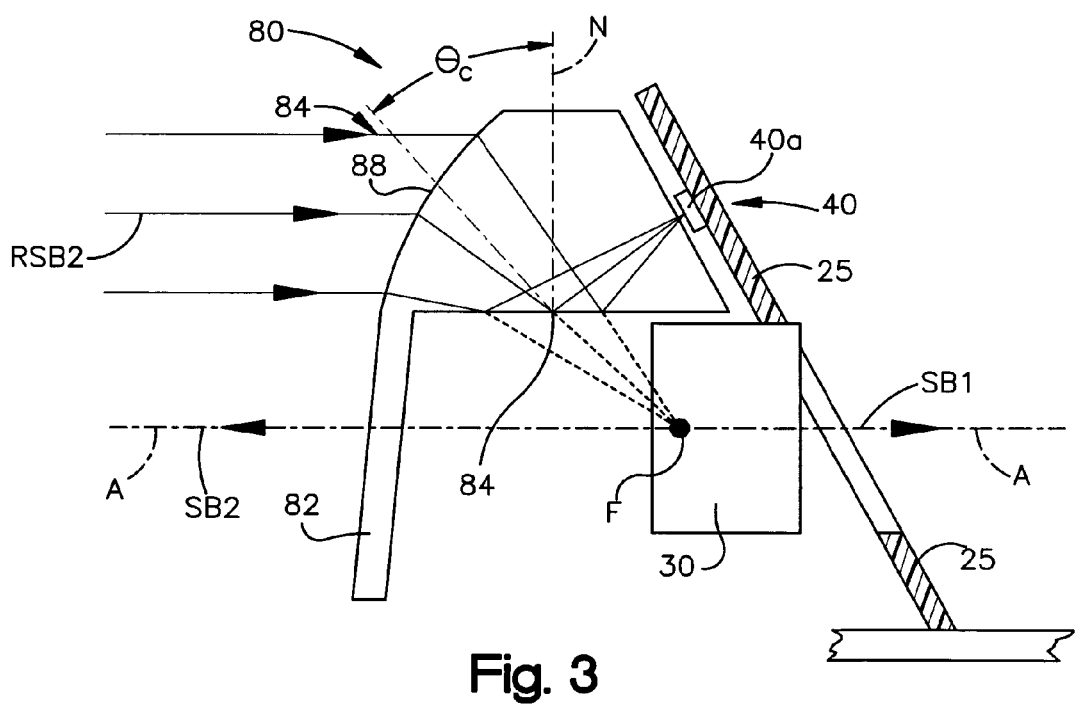
FIG. 3 a schematic side elevation view of the exit window of FIG. 2.

As can best be seen in FIG. 3, the light reflective surface 86 provides total internal reflection (TIR) of the reflected light rays RSB and redirect the rays through the lens 84 toward the photodiode 40*a* located on the PC board 25.

Figures 4, 5:
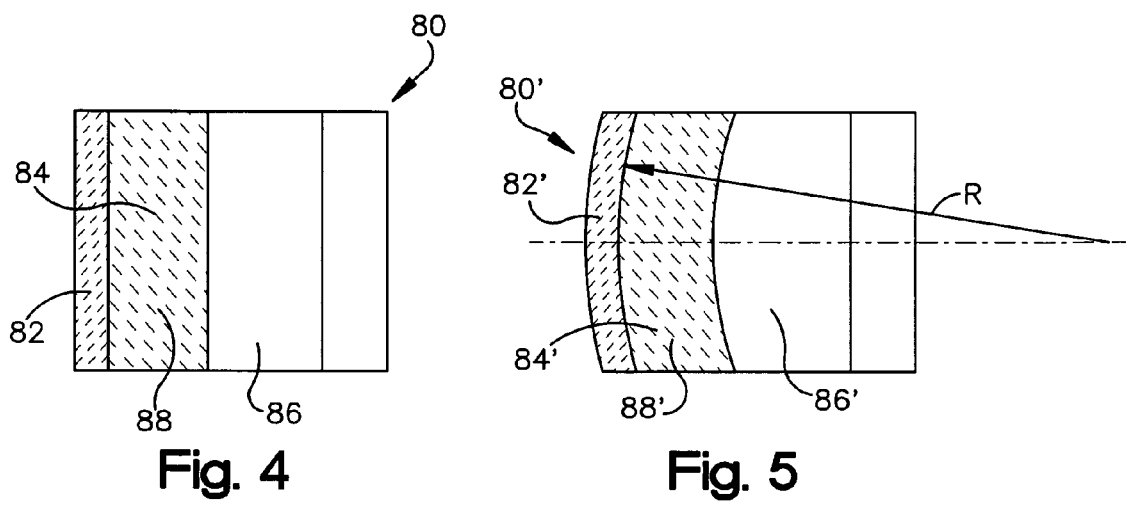
FIG. 4 is a schematic top plan view of the exit window of FIG. 2.
FIG. 5 is a schematic top plan view of a second embodiment of an exit window of the present invention.

FIG. 4 provides a schematic top view of the optic assembly 80. As can be seen the light collection lens 84 is cylindrical. The cylindrical surface looks straight when viewed from the top. However, other shapes for the light collection lens may be used. For example, in FIG. 5, the optic assembly 80' includes a exit window 82' and a light collection lens 84' which are toroidal. A toroidal surface has a radius of curvature R when viewed from the top. The optic assembly 80' includes a reflective surface 84' like the reflective surface 84 for TIR to redirect the reflected light rays RSB to the photodiode 40*a*. Alternately, the convex surface 88 of the light collection lens 84 may also be a Fresnel lens.

While the present invention has been described with a degree of particularity, it is the intent that the invention includes all modifications and alterations from the disclosed design falling with the spirit or scope of the appended claims.

We claim:

1. A portable electro-optical scanner for reading a target bar code having a plurality of bar code elements, the portable scanner comprising:
    a housing supporting a scanning module and an optic system;
    the scanning module electro-optically scanning the target bar code with a scanning beam and collecting reflected light returning from the bar code, the scanning module including a beam source emitting a scanning beam, a beam directing apparatus causing the scanning beam to be repetitively scanned along a scanning plane intersecting the target bar code and a photodetector circuitry receiving light from the target bar code; and
    the optic system including:
        an exit window through which the scanning beam passes upon exiting the housing;
        a light collection lens receiving reflected light from the target bar code and directing the reflected light toward a focal point of the lens, the focal point located on the scanning plane between the exit window and the beam directing apparatus, and
        a reflective surface disposed between the light collection lens and the collection lens focal point to redirect the reflected light passing through the light collection lens toward the photodetector circuitry.

2. The portable electro-optical scanner of claim 1 wherein the exit window and the light collection lens are integral.

3. The portable electro-optical scanner of claim 1 wherein the exit window and the light collection lens are fabricated of a single molded component.

4. The portable electro-optical scanner of claim 1 wherein the reflective surface redirects the reflected light by total internal reflection of rays of reflected light that are incident on the reflective surface at angles greater than a critical angle measured with respect to a line normal to the reflective surface.

5. The portable electro-optical scanner of claim 1 wherein the reflective surface includes a reflective coating applied to the reflective surface.

6. The portable electro-optical scanner of claim 1 wherein the beam directing apparatus is a rotating mirror.

7. An optic assembly for a portable electro-optical scanner adapted to read a target bar code having a plurality of bar code elements wherein the portable scanner includes a housing supporting a scanning module and the optic assembly, the scanning module scanning the target bar code with a scanning beam and collecting reflected light returning from the bar code and including a beam source emitting a scanning beam, a beam directing apparatus causing the scanning beam to be repetitively scanned along a scanning plane intersecting the target bar code and a photodetector circuitry receiving light from the target bar code, the optic assembly comprising:
    an exit window through which the scanning beam passes upon exiting the housing;
    a light collection lens receiving reflected light from the target bar code and directing the reflected light toward a focal point of the lens, the focal point of the lens lying on the scanning plane between the exit window and the beam directing apparatus; and
    a reflective surface disposed between the light collection lens and the collection lens focal point to redirect the reflected light passing through the light collection lens toward the photodetector circuitry.

8. The optic assembly of claim 7 wherein the exit window and the light collection lens are integral.

9. The optic assembly of claim 7 wherein the exit window and the light collection lens are fabricated of a single molded component.

10. The optic assembly of claim 7 wherein the reflective surface redirects the reflected light by total internal reflection of rays of reflected light that are incident on the reflective surface at angles greater than a critical angle measured with respect to a line normal to the reflective surface.

11. The optic assembly of claim 7 wherein the reflective surface includes a reflective coating applied to the reflective surface.

12. A scanning module for a portable electro-optical scanner adapted to read a target bar code having a plurality of bar code elements by scanning the target bar code with a scanning beam and collecting reflected light returning from the bar code, the scanning module comprising:
    a beam source emitting a scanning beam;
    a beam directing apparatus causing the scanning beam to be repetitively scanned along a scanning plane intersecting the target bar code;
    a photodetector circuitry receiving light from the target bar code; and
    an optic system including:
        an exit window through which the scanning beam passes when moving toward the target bar code;
        a light collection lens receiving reflected light from the target bar code and directing the reflected light toward a focal point intersecting the scanning plane of the scanning beam between the exit window and the beam directing apparatus, and
        a reflective surface disposed between the light collection lens and the collection lens focal point to redirect the reflected light passing through the light collection lens toward the photodetector circuitry.

13. The scanning module of claim 12 wherein the exit window and the light collection lens are integral.

14. The scanning module of claim 12 wherein the exit window and the light collection lens are fabricated of a single molded component.

15. The scanning module of claim 12 wherein the reflective surface redirects the reflected light by total internal reflection of rays of reflected light that are incident on the reflective surface at angles greater than a critical angle measured with respect to a line normal to the reflective surface.

16. The scanning module of claim 12 where the reflective surface includes a reflective coating applied to the reflective surface.

17. A portable electro-optical scanner for reading a target bar code having a plurality of bar code elements, the portable scanner comprising:
- a housing supporting a scanning module and an optic system;
- the scanning module electro-optically scanning the target bar code with a scanning beam and collecting reflected light returning from the bar code, the scanning module including a beam source emitting a scanning beam, a beam directing apparatus causing the scanning beam to be repetitively scanned along a scanning plane across the target bar code and a photodetector circuitry receiving light from the target bar code; and
- the optic system including:
  - an exit window through which the scanning beam passes upon exiting the housing;
  - a light collection lens receiving reflected light from the target bar code and directing the reflected light toward a focal point where an optical axis of the lens intersects the scanning plane of the scanning beam between the exit window and the beam directing apparatus, and
  - a reflective surface disposed between the light collection lens and the collection lens focal point to redirect the reflected light passing through the light collection lens toward the photodetector circuitry.

18. The portable electro-optical scanner of claim 17 wherein the exit window and the light collection lens are integral.

19. The portable electro-optical scanner of claim 17 wherein the exit window and the light collection lens are fabricated of a single molded component.

20. The portable electro-optical scanner of claim 17 wherein the reflective surface redirects the reflected light by total internal reflection of rays of reflected light that are incident on the reflective surface at angles greater than a critical angle measured with respect to a line normal to the reflective surface.

21. The portable electro-optical scanner of claim 17 wherein the reflective surface includes a reflective coating applied to the reflective surface.

22. The portable electro-optical scanner of claim 17 wherein the beam directing apparatus is a rotating mirror.

23. An optic assembly for a portable electro-optical scanner adapted to read a target bar code having a plurality of bar code elements wherein the portable scanner includes a housing supporting a scanning module and the optic assembly, the scanning module scanning the target bar code with a scanning beam and collecting reflected light returning from the bar code and including a beam source emitting a scanning beam, a beam directing apparatus causing the scanning beam to be repetitively scanned along a scanning plane across the target bar code and a photodetector circuitry receiving light from the target bar code, the optic assembly comprising:
- an exit window through which the scanning beam passes upon exiting the housing;
- a light collection lens receiving reflected light from the target bar code and directing the reflected light toward a focal point where an optical axis of the lens intersects the scanning plane between the exit window and the beam directing apparatus; and
- a reflective surface disposed between the light collection lens and the focal point to redirect the reflected light passing through the light collection lens toward the photodetector circuitry.

* * * * *